March 1, 1966     T. G. CRAIG ETAL     3,238,023
FLUIDIZED BED REACTOR

Filed April 25, 1963     3 Sheets-Sheet 1

THOMAS GARDNER CRAIG
ALFRED CHARLES PERRINS
INVENTORS.

BY
ATTORNEY

March 1, 1966     T. G. CRAIG ETAL     3,238,023
FLUIDIZED BED REACTOR
Filed April 25, 1963     3 Sheets-Sheet 2

THOMAS GARDNER CRAIG
ALFRED CHARLES PERRINS
INVENTORS.

BY
ATTORNEY

March 1, 1966 T. G. CRAIG ETAL 3,238,023
FLUIDIZED BED REACTOR
Filed April 25, 1963 3 Sheets-Sheet 3

THOMAS GARDNER CRAIG
ALFRED CHARLES PERRINS
INVENTORS.

BY
ATTORNEY

United States Patent Office 3,238,023
Patented Mar. 1, 1966

3,238,023
FLUIDIZED BED REACTOR
Thomas Gardner Craig, Riby, near Grimsby, and Alfred Charles Perrins, Grimsby, England, assignors to Laporte Titanium Limited, London, England
Filed Apr. 25, 1963, Ser. No. 275,707
Claims priority, application Great Britain, May 9, 1962, 17,896/62
5 Claims. (Cl. 23—284)

This invention relates to fluidized bed reactors. More particularly, it relates to reaction vessels suitable for carrying out chemical reactions or physical interactions, under fluidized bed conditions.

Previously, it has been proposed to provide a fluidized bed reactor fitted with a horizontal plate arranged to support the bed and provided with a multiplicity of perforations through which fluidizing gas can be introduced into the bed. Further, in order to prevent solid particles from falling down through the perforations, it has been proposed to provide bubble-caps or other non-return devices surmounting the perforations. For some purposes, for example, when the reactor is to be used for the chlorination of metal ores at high temperatures, it is essential to construct all parts that have surfaces exposed to the interior of the reactor above the plate of a refractory material and not of metal. The non-return devices then have to be constructed of refractory material, with the result that, in many cases, they may be damaged. As they are not readily accessible for repair, this can be a serious disadvantage.

This invention provides a fluidized bed reactor having a horizontally extending plate arranged to support a bed of particles within the vessel and provided with a multiplicity of perforations for the admission of fluidizing gas. The plate comprises a metal base plate formed with a multiplicity of perforations and surmounted by a plurality of refractory blocks, the base portions of which, possibly together with jointing material, extend over substantially the entire upper surface of the metal base plate. At least some of the blocks are provided with a bore or bores, arranged to form the sole means of communication between the perforations in the metal base plate and the region above the blocks. The upper portions of the bores extend either substantially horizontally or downwardly towards the points at which they open into the region above the plate. In order to permit the upper portions of the bores to open into the region above the plate, the upper portions or at least some of the blocks are of reduced horizontal cross-sectional area and/or some of the blocks are higher than the remaining blocks.

Inasmuch as the upper portions of the bores extend either substantially horizontally or downwardly towards the points at which they open into the region above the plate, the tendency of solid particles to pass down the bores from the bed is eliminated or substantially minimized. Therefore, it is unnecessary to provide separate non-return devices. Further, because the entire upper surface of the plate is composed of refractory material, the construction of the plate renders it suitable for use in carrying out reactions that cannot be carried out in contact with metal surfaces.

The horizontal distribution of the points at which the upper portions of the bores open into the region above the plate and the directions in which the upper portions of the bores extend can be arranged to give a suitable distribution of fluidizing gas over the horizontal cross-sectional area of the reactor above the plate.

Each bore may be branched so that a single perforation in the metal base plate is in communication through the lower part of a bore, which advantageously extends substantially vertically, with two or more substantially horizontally or downwardly extending upper portions of the bore.

Advantageously, the base portions of all the blocks that are not adjacent to the side walls of the reactor have equilateral triangular, square or regular hexagonal cross-sections of equal size, preferably, regular hexagonal cross-sections of equal size.

When only some of the blocks are formed with bores, each block may be of uniform horizontal cross-sectional area and shape throughout its whole height and the blocks that are formed with bores may be higher than the remaining blocks to allow the laterally extending upper portions of the bores to open above the upper surfaces of the remaining blocks. All the blocks may be of the same horizontal cross-sectional shape and area, or the blocks that are formed with bores may differ in cross-sectional shape and area from some or all of the remaining blocks. The blocks that are formed with bores may each be formed with one or more bores.

Advantageously, at least those blocks that are not adjacent to the side walls of the reactor are each formed with at least one bore and the upper portions of these blocks are of reduced horizontal cross-sectional area to allow the upper portions of the bores to open into the region above the plate. When the base portions of the blocks that are not adjacent to the side walls of the reactor are of polygonal horizontal cross-section, the upper portions of these blocks may be of generally pyramidal form. Advantageously, the base portions of the blocks that are not adjacent to the side walls of the reactor are of regular hexagonal horizontal cross-section and of equal size, and each of these blocks is formed with a single bore of which the lower portion is coaxial with the block and which is branched to form three upper portions of the bore, the axes of which extend substantially horizontally and lie in vertical planes that are inclined to one another at angles of substantially 120°. When the upper portions of these blocks are of generally pyramidal form, the three upper portions of each bore may open into the region above the plate in alternate pyramidal faces of the upper portion of the block in which the bore is formed. Preferably, the base portions of the blocks that are not adjacent to the side walls of the reactor are of regular hexagonal cross-section and of equal size. The upper portions of these blocks have inclined faces and each of these blocks is formed with two unbranched bores of which the lower portions extend vertically whereby their axes lie in a plane containing the axis of the block and at substantially equal distances from that axis, and of which the upper portions extend downwardly toward the base plate or at least at an angle of no more than 90° with respect to the base plate, i.e., substantially horizontally. The axes of the two upper portions of the bores in each block which is not adjacent to the side walls of the reactor may extend in substantially antiparallel directions and these axes may be inclined at an angle of 60° to the said plane containing the axis of the block. The upper portions of each of these blocks may have six inclined faces of which two opposite faces are rectangular and meet in a horizontal ridge and of which the remaining four faces are triangular and terminate at the ends of the ridge. The two upper portions of the bores in each of these blocks may then open into the region above the blocks one in each of the two opposite rectangular faces of the upper portion of the block in which the bores are formed.

There may be provided a plurality of individual supply pipes for the fluidizing gas, one connected to each perforation in the metal base plate. Advantageously, the reactor includes a distributing chamber (commonly referred to as a windbox) below the plate, which has one or more inlets for the fluidizing gas and which provides communication between the said inlet or inlets and the perforations in the metal base plate. In order to obtain a uniform distribution of the fluidizing gas between the perforations in spite of fluctuations in the pressure distribution immediately above the plate, it is essential, of course, that there be a substantial pressure drop between the distributing chamber and the region above the plate. A pressure drop within the range of from one half to twice the pressure drop across the fluidized bed is generally suitable. This pressure drop may be obtained by providing, for each perforation in the metal base plate, a length of narrow bore tubing of which the upper end communicates with the perforation and the lower end communicates with the interior of the distributing chamber. Each length of narrow bore tube may be either straight or curved, for example, in the form of a helix or hairpin bend. Instead, each perforation in the plate may be provided with an orifice of restricted cross-sectional area obtained, for example, by securing an apertured disc to the underside of the metal base plate, the cross-sectional area of the aperture being less than the cross-sectional area of the perforation in the metal base plate and the aperture providing the sole means of communication between the distributing chamber and the perforation.

The metal base plate is advantageously made of steel. The refractory blocks may be made of concrete or other refractory material capable of being cast. Instead, there may be used as a refractory material capable of being moulded. A suitable cement may be used as a jointing material.

Two forms of fluidized bed reactor constructed in accordance with the invention and suitable for use in the chlorination of titaniferous materials now will be described in conjunction with the accompanying drawings in which.

Figure 1:
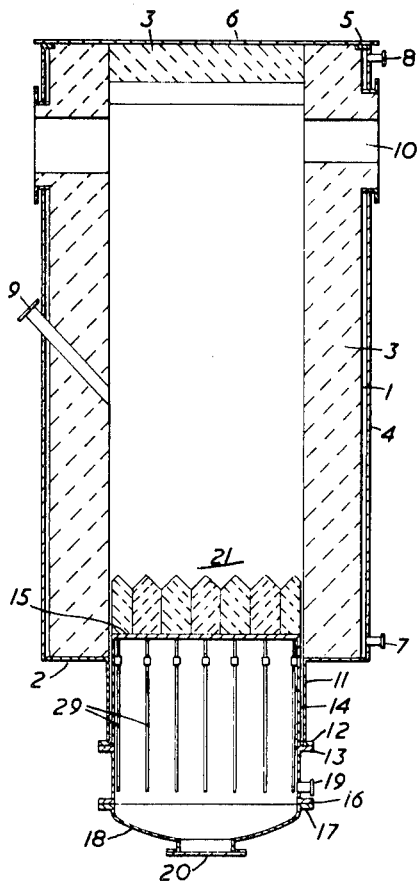
FIGURE 1 is an axial cross-section of one form of reactor.

Referring to FIG. 1 of the drawings, one form of reactor comprises a cylindrical steel shell 1, which is mounted with its axis vertical and which is secured at its lower end to an annular steel plate 2, which extends horizontally and is coaxial with the shell 1. The part of the annular plate 2 that lies on the inside of the shell 1 serves as a support for a refractory lining 3, which insulates the shell 1 from the interior of the reactor above the annular plate 2.

Surrounding the shell 1 is an outer cylindrical shell 4, which is coaxial with the shell 1 and is secured at its lower end to the annular plate 2 close to the periphery thereof. The upper ends of the shells 1 and 4 are secured to a steel ring 5, which serves as a support for a circular cover plate 6. Below the cover plate 6, the refractory lining 3 extends across the top of the reactor. The region bounded by the shells 1 and 4, the annular plate 2 and the ring 5 forms a jacket into which water or other suitable coolant fluid can be introduced through an inlet 7 close to the base of the jacket and from which the water or other coolant fluid can be withdrawn through an outlet 8 close to the top of the jacket.

The reactor is provided with an inlet 9 for solid material and a vapor outlet 10.

Secured to the underside of the annular plate 2, immediately adjacent to the inner edge thereof, is a downwardly extending cylindrical member 11, which is provided at its lower end with an outwardly extending annular flange 12. The flange 12 is bolted to a similar flange 13, which is situated directly below the flange 12 and which extends outwardly from an inner cylindrical member 14. At its upper end, the inner cylindrical member 14 is secured to the underside of a horizontal perforated steel base plate 15 immediately adjacent to the periphery of the base plate 15. The lower surface of the base plate 15 is slightly above the upper surface of the annular plate 2 and the diameter of the base plate 15 is slightly less than the inner diameter of the refractory lining 3 so that there is a narrow annular gap between the base plate 15 and the refractory lining 3. At its lower end, the inner cylindrical member 14 is provided with an outwardly extending annular flange 16, which is bolted to a similar flange 17, which is situated directly below the flange 16 and which extends outwardly from the edge of a dome-shaped member 18 which serves to close the bottom of the reactor. The chamber formed by the base plate 15, the inner cylindrical member 14 and the dome-shaped member 18 serves as a distributing chamber or windbox. An inlet 19 for introducing fluidizing gas into the chamber is formed in the inner cylindrical member 14 between the flange 13 and the flange 16, and the chamber is provided with an inspection plate 20 which covers a central aperture in the dome-shaped member 18.

Mounted on the top of the perforated steel base plate 15 are a number of refractory blocks which are indicated generally by the reference numeral 21. The steel base plate 15 and the refractory blocks 21 together form a plate for supporting a fluidized bed, not shown.

Figure 2:
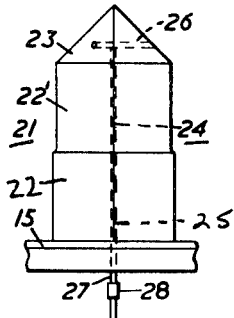
FIG. 2 is a side view, partly in cross-section, of a part of the perforated plate of the reactor shown in FIG. 1.
Figure 3:
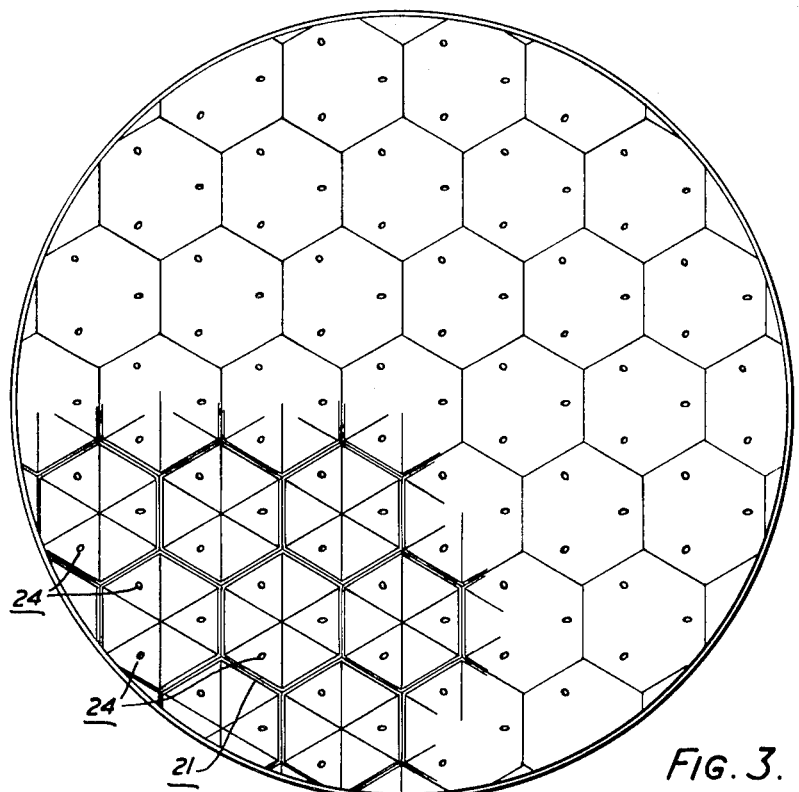
FIG. 3 is a plan view of the perforated plate of the reactor shown in FIG. 1.

Referring to FIGS. 2 and 3 of the drawings, each of the blocks 21 has a base portion 22 which is of regular hexagonal horizontal cross-section and an upper portion 22' of slightly reduced cross-sectional area to facilitate the introduction of jointing material between the blocks after they have been placed in position on the steel base plate 15. Blocks 21 each have a portion 23, which is of regular pyramidal form. Each of the blocks 21 is formed with a bore which is indicated generally by the reference number 24 and of which the lower portion 25 is vertical and coaxial with the block and which, within the portion 23 of the block 21, is branched to form three horizontally extending terminal portions 26. The three horizontally extending terminal portions 26 of the bore 24 are inclined to one another at angles of 120°, they are at an angle of no more than 90° with respect to plate 15 and they terminate with open ends in alternate triangular faces of the portion 23 of the block 21. The blocks 21 are so orientated that, of each pair of opposing triangular faces of two adjacent blocks 21, one of the triangular faces has an opening leading to a terminal portion 26 of a bore 24 and the other face has no such opening. The number of blocks 21 is equal to the number of perforations in the steel base plate 15 and the lower ends of the lower portions 25 of the bores 24 register with the perforations.

The blocks 21 that are adjacent to the edge of the steel base plate 15 are trimmed, when necessary, to prevent any of the blocks 21 from overlapping the edge of the plate 15 whereby the outer surface of the base portion of the assembly of blocks 21 is cylindrical and separated by only a narrow annular gap from the inner surface of the refractory lining 3.

If desired, a thin layer of jointing material may be interposed between the upper surface of the steel base plate 15 and the under surfaces of the blocks 21. Also, any gaps that may exist between the blocks 21 may be filled with jointing material.

Secured to the underside of the steel base plate 15 are a number of short tubes 27, one for each perforation, of which the upper ends register with the perforations and of which the lower ends are releasably connected by couplings 28 to the upper ends of long vertical tubes 29. At their lower ends, the tubes 29 open into distributing chamber. In order to minimize the risk of blockage, which might occur at a point where the diameter of one of the paths along which gas flows from the distributing chamber to the part of the reactor above the plate was restricted, these paths are all of uniform diameter throughout. Thus, the tubes 27 and 29, the perforations in the steel base plate 15 and the upper and lower portions 26 and 25, respectively, of the bores 24 are all of the same uniform internal diameter.

In operation, the solid material that is to form the bed is introduced into the part of the reactor above the plate through the inlet 9 and fluidizing gas is introduced into the distributing chamber through the inlet 19. The fluidizing gas passes through the tubes 29 and 27, the perforations in the steel base plate 15 and the bores 24 and so enters and fluidizes the bed of solid material supported by the plate. The gases or vapors rising from the bed, possibly together with entrained fine solid particles produced in the bed, leave the reactor through the outlet 10. Also, some solid particles fall down between the blocks 21 and the refractory lining 3 filling up both that space and the space between the cylindrical members 11 and 14.

With suitable choice of dimensions, it is possible to arrange that the pressure drop between the distributing chamber and region immediately above the plate is of the same order as the pressure drop across the bed itself, and this insures that the fluidizing gas is uniformly distributed between the different bores 24.

The fact that the terminal portions 26 of the bores 24 extend horizontally or downwardly toward plate 15 eliminates any tendency for solid particles to fall into and block the bores 24.

By releasing the bolts that secure together the flanges 16 and 17, the dome-shaped member 18 can be removed to give access to the interior of the distributing chamber. If it is desired to vary the pressure drop between the distributing chamber and the region immediately above the plate (for a given rate of supply of fluidizing gas), this can be done by replacing the tubes 29 by others of different length. If it is desired to obtain a very large pressure drop so that the tubes 29 have to be relatively long, they may be helical or formed with a hairpin bend instead of being straight.

By releasing the bolts that secure together the flanges 12 and 13, the inner cylindrical member 14, the steel base plate 15 and the assembly of blocks 21 can be removed as a unit for maintenance or other purposes.

Figure 4:
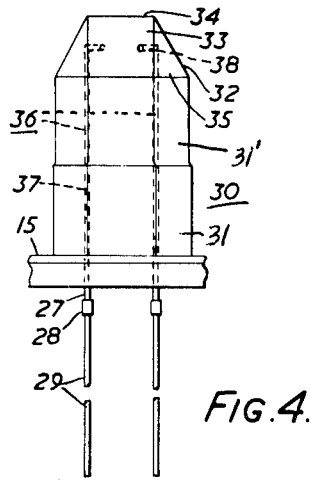
FIG. 4 is a side view of one of the refractory blocks used to form a part of the perforated plate in a second form of reactor.
Figure 5:
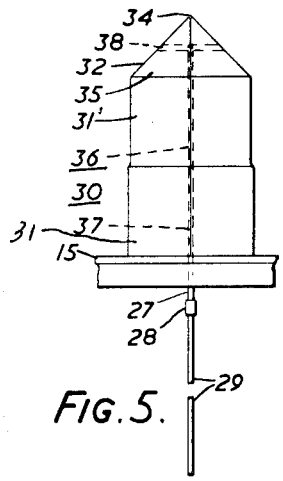
FIG. 5 is an end view of the refractory block shown in FIG. 4.
Figure 6:
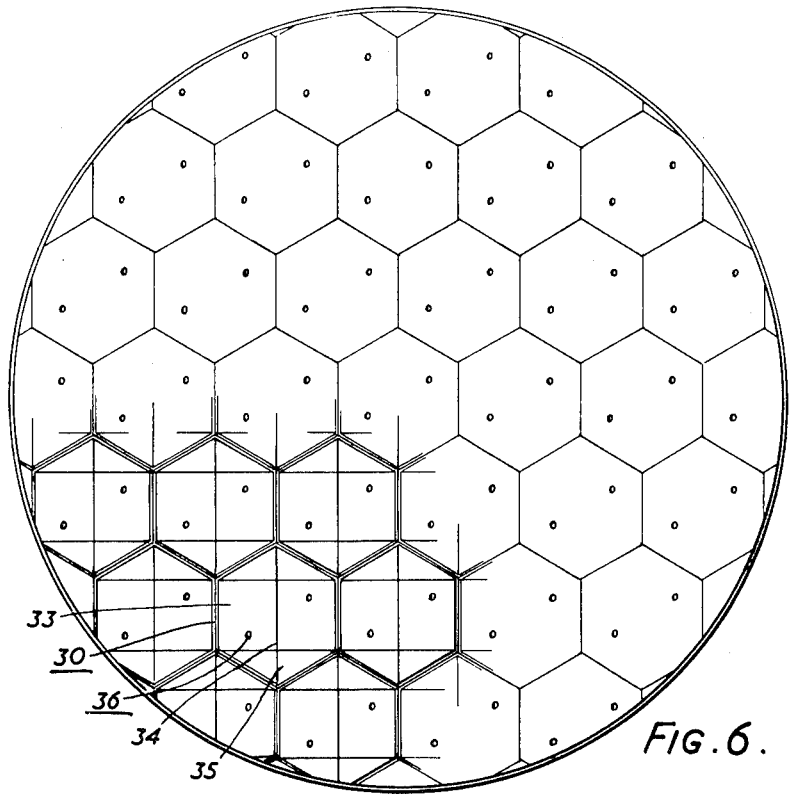
FIG. 6 is a plan view of the perforated plate of the second form of reactor.

Referring to FIGS. 4, 5 and 6 of the drawings, the second form of reactor is similar to the first form except in the disposition of the perforations in the steel base plate 15 and the form of the refractory blocks. Thus, the blocks 21 are replaced by blocks which are indicated generally by the reference numeral 30. The base portion 31 of each block 30 is of regular hexagonal cross-section. The upper portion 31' is of slightly reduced cross-sectional area to facilitate the introduction of jointing material between the blocks after they have been placed in position on the steel base plate 15. The portion 32 of each block has six inclined faces of which two opposite faces 33 are rectangular and meet to form a horizontal ridge 34. The remaining four faces 35 are triangular and terminate at the ends of the ridge 34.

Each of the blocks 30 is provided with two bores, indicated generally by the reference numeral 36. Each bore is formed with a vertically extending lower portion 37 and a terminal portion 38 extending at an angle of no more than 90° with respect to plate 15. The arrangement of the bores 36 is such that the axes of the lower portions 37 pass through the two ends of the horiontal ridge 34. The axes of the terminal portions 38 of the two bores 37 in each block 30 extend in antiparallel directions that are inclined at an angle of 60° to the vertical plane containing the axes of the lower portions 37 of the two bores, and the upper portions 38 of the two bores open into the region above the plate in the two rectangular faces 33.

The blocks 30 that are adjacent to the edge of the steel base plate 15 are trimmed to prevent them from overlapping the edge of the plate 15 whereby the outer surface of the base portion of the assembly of blocks 30 is cylindrical and separated by only a narrow annular gap from the inner surface of the refractory lining 3.

The number of perforations in the steel base plate 15 is equal to the number of bores 36, and the perforations are in register with the lower ends of the lower portions 37 of the bores 36.

As an example of suitable dimensions for the second form of reactor, the diameter of the steel base plate 15 may be five feet three inches and it may be provided with 66 perforations. The diameter of each of the perforations in the steel base plate 15, which is equal to the internal diameters of the bores 36 and of the tubes 27 and 29, may be ¼ inch. The distance separating opposite faces of the lower halves of the base portion 31 of each of the blocks 30 may be 9¾ inches, this distance being reduced to 9½ inches in the upper halves of the base portions 31 of the blocks 30. The height of the portions 31 plus 31' of the blocks 30 may be fourteen inches and the height of the portions 32 may be 4¾ inches. The length of each of the horizontal ridges 34 may be 5⅝ inches. The axes of the terminal portions 38 of the bores 36 may be 2¼ inches above the top of the portions 31' of the blocks 30.

The second form of reactor operates in the same manner as the first form, but the fact that the bores 36 are unbranched has the advantage that, if the portion 38 of one of the bores should become completely blocked, the pressure drop across the blockage would be equal to the whole of the pressure drop between the distributing chamber and the region immediately above the plate. This factor, which does not apply if only one branch of a branched bore becomes blocked, makes it considerably more likely that any blockages that may momentarily form in the portions 38 of the bores 36 will clear themselves in operation.

In both the first and second forms of reactor, the refractory blocks may be formed with rounded edges and corners to facilitate manufacture.

Blockage of bores may occur if the blocks become so damaged that, when the inlet gas is shut off, solid material can enter the bores. On refluidizing, some of the bores may fail to clear. However, if there is a supply pipe for each of the bores, the pressure in the supply pipe for an uncleared bore can be increased to remove the solid from the bore. It is therefore advantageous to provide an individual supply pipe for at least a small number of the bores and preferably, an individual supply pipe for each bore.

What is claimed is:

1. A fluidized bed reactor comprising a reaction vessel having a side wall, a bottom wall and a base plate disposed across said vessel near the bottom wall, said plate being adapted to support a bed of particles to be fluidized and being provided with a plurality of perforations for the passage therethrough of fluidizing gas, a plurality of refractory blocks each having a base portion and an upper portion, the base portions of said blocks extending over substantially the entire upper surface of said plate, at least those blocks that are not adjacent to said side wall being provided with bores, each of said bores having an opening in the base portion of its block arranged in operative communication with the perforation in said plate and at least one terminal portion in the upper portion of its block, said bores forming the sole means of communication between the region below the base plate and the region above the blocks, the upper portions of at least those blocks which are provided with bores being of reduced horizontal cross-sectional area with respect to their lower portions and the terminal portions of the bores exiting through said upper portions into the region above the plate at an angle of no more than 90° with respect to said plate.

2. A fluidized bed reactor comprising a reaction vessel having a side wall, a bottom wall and a base plate disposed across said vessel near the bottom wall, said plate being adapted to support a bed of particles to be fluidized and being provided with a plurality of perforations for the passage therethrough of fluidizing gas, a plurality of refractory blocks each having a base portion and an upper portion, the base portions of said blocks extending over substantially the entire upper surface of said plate, at least those blocks that are not adjacent to said side wall being provided with bores, each of said bores having an opening in the base portion of its block arranged in operative communication with the perforations in said plate and at least one terminal portion in the upper portion of its block, said bores forming the sole means of communication between the region below the base plate and the region above the blocks, the base portions of at least those blocks that are provided with bores having a polygonal horizontal cross-section and the upper portions of those blocks having a generally pyramidal form, and the terminal portions of the bores exiting through said upper portions into the region above the plate at an angle of no more than 90° with respect to said plate.

3. A fluidized bed reactor comprising a reaction vessel having a side wall, a bottom wall and a base plate disposed across said vessel near the bottom wall, said plate being adapted to support a bed of particles to be fluidized and being provided with a plurality of perforations for the passage therethrough of fluidizing gas, a plurality of refractory blocks supported by the base plate, said blocks being joined together by a joining material and extending over substantially the entire upper surface of the base plate, at least those blocks that are not adjacent to the side wall of the reaction vessel being provided with bores arranged in operative communication with the perforations in the plate to form the sole means of communication between the region below the base plate and the region above the blocks, each of those blocks having upper portions of a generally pyramidal form, each of said bores having terminal portions opening into the region above the plate in alternate pyramidal faces of the upper portion of the block in which the bore is formed at an angle of no more than 90° with respect to said plate and the blocks provided with bores being oriented in such manner that of each pair of opposing pyramidal faces of two adjacent blocks one of the faces has a terminal opening and the other does not have such an opening.

4. A fluidized bed reactor comprising a reaction vessel having a side wall, a bottom wall and a base plate disposed across said vessel near the bottom wall, said plate being adapted to support a bed of particles to be fluidized and being provided with a plurality of perforations for the passage therethrough of fluidizing gas, a plurality of refractory blocks supported by the base plate, said blocks being joined together by a joining material and extending over substantially the entire upper surface of the base plate, at least those blocks that are not adjacent to the side wall of the reaction vessel being provided with bores arranged in operative communication with perforations in the plate to form the sole means of communication between the region below the base plate and the region above the blocks, each of those blocks having upper portions including six inclined faces of which two opposite faces are rectangular and meet in a horizontal ridge and of which the remaining four faces are triangular and terminate at the ends of the ridge, each of said bores having terminal portions opening into the region above the plate through said opposite rectangular faces at an angle of no more than 90° with respect to the base plate.

5. A fluidized bed reactor comprising a reaction vessel having a side wall, a bottom wall and a base plate disposed across said vessel near the bottom wall, said plate being adapted to support a bed of particles to be fluidized and being provided with a plurality of perforations for the passage therethrough of fluidizing gas, a plurality of refractory blocks each having a base portion and an upper portion, the base portions of said blocks extending over substantially the entire upper surface of said plate, at least some of said blocks being provided with bores, each of said bores having an opening in the base portion of its block arranged in operative communication with the perforations in said plate and at least one terminal portion in the upper portion of its block, said bores forming the sole means of communication between the region below the base plate and the region above the blocks, the upper portions of at least those blocks which are provided with bores being of reduced horizontal cross-sectional area with respect to their lower portions and the terminal portions of the bores exiting through said upper portions into the region above the plate at an angle of no more than 90° with respect to said plate.

References Cited by the Examiner

UNITED STATES PATENTS

| 2,841,476 | 7/1958 | Dalton | 23—284 |
| 2,944,009 | 7/1960 | Huntley et al. | 23—288 X |
| 2,990,260 | 6/1961 | Mungen | 23—284 X |
| 3,057,701 | 10/1962 | Coates et al. | 23—284 |

MORRIS O. WOLK, *Primary Examiner.*

JAMES H. TAYMAN, Jr, *Examiner.*